United States Patent Office 3,457,320
Patented July 22, 1969

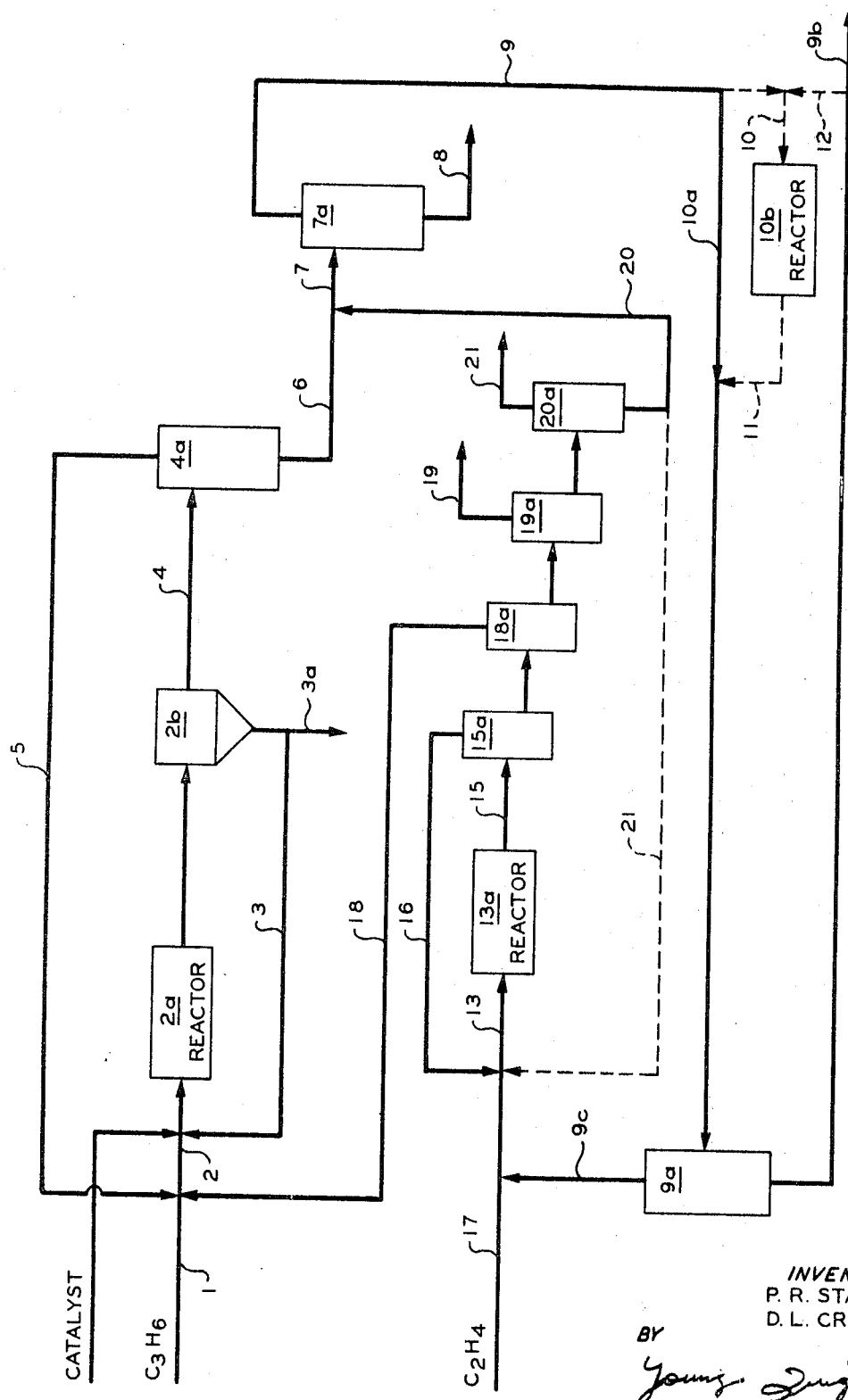

3,457,320
PRODUCTION OF 3-METHYL-1-BUTENE
Paul R. Stapp and Donald L. Crain, Bartlesville, Okla., assignors to Phillips Petroleum Company, a corporation of Delaware
Filed Sept. 19, 1966, Ser. No. 580,303
Int. Cl. C07c 11/02, 5/24, 3/62
U.S. Cl. 260—683                                    7 Claims This invention relates to a process for upgrading by-products produced in the dimerization of propylene. In one aspect, it relates to the production of 3-methyl-1-butene from dimerization products of propylene. In another aspect, it relates to the contact, under reaction conditions, of 4-methyl-2-pentene and ethylene to produce 3-methyl-1-butene and propylene which is dimerized to produce more 4-methyl-2-pentene.

The olefin, 3-methyl-1-butene, is a valuable monomer for the production of high melting polymers. Such polymers are highly crystalline materials having melting points of about 300° C. and thus have important fiber applications. The 3-methyl-1-butene is also an isoprene precursor. The present invention provides a convenient process for the production of this material using readily available raw materials, namely, propylene and ethylene.

It is therefore one object of this invention to provide an improved method for producing 3-methyl-1-butene.

Other aspects, objects and the several advantages of this invention will be apparent to one skilled in the art from a study of this disclosure, drawing and the appended claims.

In accordance with one embodiment of this invention, propylene is contacted with a dimerization catalyst in a first reaction zone at conditions suitable to dimerize at least part of the propylene in the feed to form at least some 4-methyl-2-pentene. A 4-methyl-2-pentene-containing fraction is separated from the remainder of the dimerization effluent and contacted with ethylene in a second reaction zone in the presence of an olefin disproportionation catalyst at conditions sufficient to effect the conversion of the 4-methyl-2-pentene to propylene and 3-methyl-1-butene. Unreacted propylene is recovered from the dimerization effluent and is recycled to the dimerization zone along with propylene produced in a second reaction zone. Product 3-methyl-1-butene is recovered from the effluent of the second reaction zone while unreacted ethylene recovered from that same effluent can be recycled.

In another embodiment of this invention, the propylene dimers from the first reaction zone are passed through an olefin isomerization zone containing an olefin isomerization catalyst under conditions which enhance the 4-methyl-2-pentene content of that propylene dimer stream. A 4-methyl-2-pentene-containing fraction is then separated from that stream and then passed into the above described second reaction zone where it is contacted with ethylene in the presence of an olefin disproportionation catalyst to produce propylene and 3-methyl-1-butene.

The concept of this invention can be more adequately illustrated by reference to the drawing. For convenience and simplicity, conventional valves, pumps, heaters, heat exchangers, controls, and the like have been omitted.

Referring now to the drawing, fresh propylene along with propylene recycled from fractionation zones hereinafter detailed is introduced by way of conduit 2 to dimerization reactor 2a wherein it is contacted at dimerization conditions with an olefin dimerization catalyst. The catalyst is separated from the reaction effluent in separator 2b and returned to the reaction zone through conduit 3, portion being removed for recovery and/or regeneration by means of bleed stream 3a.

Any conventional propylene dimerization catalyst can be used in this first reaction zone. As an example, the catalyst in this reaction zone can be tripropylaluminum which can be brought in contact with the propylene at 25–400° C., preferably 150–250° C. and at 10–1,000 atmospheres, preferably 30–80 atmospheres. Such a catalyst can be present in the reaction zone at concentrations of 0.001–5.0 mole percent, preferably 0.1–0.5 mole percent based on the propylene feed. Dimerization of propylene using this catalyst can be carried out continuously or batchwise with propylene conversions of about 80–95 percent.

Other propylene dimerization catalysts which can be used include alkali metal catalysts either free or supported on suitable support materials. For example, a sodium-potassium alloy, containing about 75 weight percent potassium, can be contacted with the propylene at about 150° C. with a residence time of about 15 hours to yield a suitable mixture of propylene dimers. Still other dimerization catalysts which can be used are the reduced nickel-containing complex catalysts or the nickel catalysts such as the $\pi$-allylnickel iodide/triphenylphosphine/ethylaluminum dichloride catalysts. In general, any catalyst system which is capable of conveniently converting propylene to dimers including 4-methyl-2-pentene is satisfactory.

Returning now to the drawing, reaction effluent comprising 4-methyl-2-pentene along with other isomers and a minor amount of unconverted propylene is passed by way of conduit 4 to suitable fractionating means 4a wherein unreacted propylene is removed as overhead product by way of conduit 5, and recycled into admixture with fresh propylene feed in the dimerization zone. Bottoms product from fractionation zone 4a comprising the 4-methyl-2-pentene and other isomers is passed by way of conduits 6 and 7 to fractionator 7a wherein the hexene isomers are separated from the heavy by-products of the dimerization reaction which are removed from the process through conduit 8. The overhead product from fractionator 7a is passed through conduits 9 and 10a to fractionator 9a in which 4-methyl-2-pentene and 4-methyl-1-pentene are separated from the hexene mixture and removed as overhead through conduit 9c. Alternatively, this overhead stream in conduit 9c can be further separated using additional separation means (not shown) to remove the 4-methyl-1-pentene from the process as another product, the 4-methyl-2-pentene being retained for subsequent conversion in reactor 13a in the process. The 2-methyl-2-pentene and 2-methyl-1-pentene are removed from the process through conduit 9b. Alternatively, these latter two isomers can be recycled to the process in an embodiment hereinafter described.

The 4-methyl-2-pentene and 4-methyl-1-pentene in conduit 9c are blended with ethylene from conduit 17 and also from conduit 16 which is the overhead from a hereinafter described fractionation zone. This mixture of hexenes and ethylene is passed into reaction zone 13a where it is contacted, under reaction conditions, with an olefin disproportionation catalyst.

Any olefin disproportionation catalyst can be used. For example, some olefin disproportionation catalysts which are suitable for effecting the desired reaction in the second reaction zone are described in copending patent application Ser. No. 516,673 of Donald L. Crain and assigned to Phillips Petroleum Company. In general, such catalysts are those which comprise or are prepared from such materials as oxides of molybdenum, tungsten, vanadium, niobium, tantalum, and rhenium, and hexacarbonyls and sulfides of tungsten and molybdenum. These catalytic materials are generally associated with catalytic support materials such as silica, alumina, silica-alumina, magnesia-titania, zirconia, thoria, aluminum phosphate, and zirconium phosphate. The catalytic agents are the reaction products resulting from the admixture, under activating conditions, of such promoter materials and such support materials. Other inert materials can also be present in the catalyst composition in minor amounts. In addition, the catalyst can contain minor amounts of some materials which, in some instances, exert a beneficial effect on the process. Such materials can include cobalt oxide and alkaline substances such as compounds of the alkali and alkaline earth metals. Some specific examples of suitable catalysts include molybdenum oxide on alumina, and tungsten oxide on silica. Particularly preferred are silica-supported catalysts containing 2–10 weight percent tungsten oxide and which have been treated with 0.01–0.1 weight percent potassium carbonate in an activation treatment carried out in flowing air at 900–1500° F.

The conditions for the reaction of the 4-methyl-2-pentene and ethylene in contact with the olefin disproportionation catalyst include 0–1000 p.s.i.g., preferably 10–150 p.s.i.g., for periods of 0.1 second to about 24 hours or more. Depending upon the specific catalyst utilized, the conversion can be carried out at temperatures which may range from about 0 to 1300° F. For the preferred tungsten oxide/silica catalyst, the reaction can be carried out at 500–1300° F., preferably 650–800° F. The process can be carried out continuously utilizing a fixed catalytic bed through which the hexenes and the ethylene are passed at a rate suitable to obtain the desired degree of conversion under the chosen reaction conditions. Other contacting methods such as, for example, moving bed, fluidized bed, or ebulated bed contacting can be utilized. Generally, the mole ratio of ethylene to olefin can vary over a wide range. Usually, at least three moles of ethylene per mole of hexene is utilized to minimize side reactions.

Returning again to the drawing, the effluent from reaction zone 13a, comprising unreacted ethylene, 4-methyl-2-pentene, 4-methyl-1-pentene and products 3-methyl-1-butene, is passed by way of conduit 15 to fractionation zone 15a wherein ethylene is removed as overhead product through conduit 16 and recycled into the admixture with fresh ethylene feed to reaction zone 13a. The bottoms product is passed to fractionation zone 18a from which propylene is removed as overhead product and is passed by way of conduit 18 into recycle with the fresh propylene feed to dimerization zone 2a. Bottoms product from fractionator 18a is passed to fractionator 19a wherein by-product butenes are separated as overhead product by way of conduit 19, the bottoms product being conducted to fractionator 20a. The product 3-methyl-1-butene is removed as the overhead through conduit 21. The unconverted 4-methyl-2-pentene and 4-methyl-1-pentene (if present) can be returned to the process at any convenient location such as fractionator 7a by means of conduit 20. If desired, a portion of the unreacted 4-methyl-2-pentene in conduit 20 can be directly recycled to reactor 13a through conduit 21.

In another embodiment of the present invention, at least a part of the stream of mixed hexenes in conduits 9 and 10 is passed into isomerization zone 10b and contacted with an olefin isomerization catalyst therein. The isomerization hexenes are then passed into fractionator 9a by means of conduit 11. The overhead product of fractionator 9a is processed further as described above. However, in this embodiment, the bottoms product of fractionator 9a, containing the 2-methyl-2-pentene and 2-methyl-1-pentene, need not be withdrawn from the process through conduit 9b but can be recycled to isomerization zone 10b by way of conduit 12 for further isomerization and the production of additional 4-methyl-2-pentene. It is to be noted also that, in this embodiment, the 4-methyl-1-pentene need not be removed from the process, but can be carried along with the reactive 4-methyl-2-pentene and essentially recycled to extinction if desired.

Any conventional olefin isomerization catalyst can be used in the isomerization zone of this process. For example, catalysts such as magnesia, alumina, silica, cobalt oxide, iron oxide, manganese oxide, and the like, can be used. A preferred catalyst is magnesium oxide which has a surface area of at least 1 m.$^2$/g. and which has been activated in flowing air about 1100° F. The conditions for the operation of the isomerization zone will depend upon the specific catalyst chosen. For the preferred magnesia catalyst, the isomerization is carried out at 400–1000° F., preferably 700–900° F. at 0–1000 p.s.i.g., preferably 0–100 p.s.i.g. at any residence time or throughput rate which will effect the desired degree of isomerization. Any type of contacting can be used although fixed bed operation is preferred.

Obviously, the described arrangement could be modified to more effectively accommodate specific situations wherein product yields may vary depending on operating conditions and the particular catalysts utilized. For example, the use of alkali metal propylene dimerization catalysts produces substantial quantities of the 4-methyl-2-pentene such that most if not all of the hexenes in conduit 9 can be passed directly, via conduit 10a, to column 9a and reaction zone 13a. Similarly, the fractionation zones can be arranged and/or combined in various ways depending upon the stream compositions, the desired product quality, and the like.

EXAMPLE

In an example according to the present invention, propylene is fed into dimerization reactor 2a. Contact is made in reactor 2a with a mineral oil solution of tripropylaluminum at 200° C., at 50 atmospheres, and with a residence time of about 30 minutes, 0.2 mole of the tripropylaluminum being present for each mole of propylene. The effluent of the dimerization reactor 2a is separated from the catalyst in separator 2b and conducted to fractionators 4a and 7a from whence the mixed hexenes are then conducted via conduits 9 and 10 to isomerization reactor 10b. In reactor 10b contact is made with a fixed bed of magnesia pellets which have a surface area of about 75 m.$^2$/g. and which have been activated in flowing air at 1100° F. The isomerization is carried out at 800° F., at 0 p.s.i.g., and with a weight hourly space velocity of about 15 w./w./hr. The effluent from isomerization reactor 10b is conducted to fractionator 9a from which 2-methyl-1-pentene and 2-methyl-2-pentene are removed as a bottom fraction and recycled to isomerization reactor 10b. An overhead fraction containing 4-methyl-2-pentene and 4-methyl-1-pentene is blended with ethylene and conducted to ethylene/hexene reactor 13a where it is contacted with a fixed bed of pelleted silica catalyst containing 7 weight percent tungsten oxide, having a surface area of about 300 m.$^2$/g., and which has been treated with about 0.1 weight percent $K_2CO_3$ prior to activation at 1100° F. in flowing air. Other conditions are 750° F., 50 p.s.i.g., and a weight hourly space velocity of 10 w./w./hr. The effluent from this reactor is separated in a series of fractionators to isolate the 3-methyl-1-butene product and recycle other intermediate products to appropriate points in the process. The compositions of the various streams are shown in the table, wherein the stream numbers correspond to the conduit numbers of FIGURE 1.

TABLE

| Stream | \ | \ | \ | \ | \ | \ | \ | \ | \ | \ | \ | \ | \ | \ | \ | \ | \ | \ | \ |
|---|---|---|---|---|---|---|---|---|---|---|---|---|---|---|---|---|---|---|---|
| | | | | | | | | | Pounds per hour | | | | | | | | | | |
| | 1 | 2 | 4 | 5 | 6 | 7 | 8 | 9 | 10 | 11 | 12 | 13 | 15 | 16 | 17 | 18 | 19 | 20 | 21 |
| Component: | | | | | | | | | | | | | | | | | | | |
| Propylene | 402 | 1,000 | 200 | 500 | | | | | | | | | 398 | | 398 | | | | |
| Mixed hexenes | | | | 795 | | 795 | 1,847 | | 1,847 | 7,700 | | | | | | | | | |
| 2-methyl-1-pentene | | | | | | | | | | 2,613 | 2,613 | | | | | | | | |
| 2-methyl-2-pentene | | | | | | | | | | 3,240 | 3,240 | | | | | | | | |
| 4-methyl-1-pentene | | | | | | | | | | 282 | | 282 | 259 | | | | | 259 | |
| 4-methyl-2-pentene | | | | | | | | | | 1,565 | | 1,565 | 793 | | | | | 793 | |
| 3-methyl-1-butene | | | | | | | | | | | | | 657 | | | | | | 657 |
| Mixed butenes | | | | | | | | | | | | | | | | 3 | | 3 | |
| Ethylene | | | | | | | | | | | | 2,460 | 2,195 | | 2,195 | 265 | | | |
| Heavies | | | 5 | | 5 | 8 | 8 | | | | | | 3 | | | | | 3 | |

Reasonable variation and modification will be apparent to one skilled in the art in view of the foregoing disclosure, the drawing, and the appended claims to this invention, the essence of which is that there is provided a method for producing 3-methyl-1-butene from propylene and ethylene by dimerizing the propylene in the presence of an olefin dimerization catalyst and subjecting the 4-methyl-2-pentene produced to contact with an olefin disproportionation catalyst in the presence of ethylene.

We claim:

1. A method of producing 4-methyl-1-pentene and 3-methyl-1-butene from propylene and ethylene which comprises:
    (a) contacting said propylene with an olefin dimerization catalyst at dimerization conditions to dimerize at least a part of said propylene to produce a mixture comprising 4-methyl-1-pentene and 4-methyl-2-pentene;
    (b) recovering said 4-methyl-1-pentene from said mixture as product; and
    (c) contacting said 4-methyl-2-pentene with ethylene in the presence of an olefin disproportionation catalyst at conditions sufficient to promote conversion of the 4-methyl-2-pentene to convert at least a part of said 4-methyl-2-pentene to a mixture of 3-methyl-1-butene and propylene.

2. The method of claim 1 wherein
    (a) said olefin dimerization catalyst is selected from the group consisting of sodium-potassium alloy, tripropylaluminum and π-allylnickel iodide/triphenylphosphine/ethylaluminum dichloride catalyst; and
    (b) said disproportionation catalyst comprises a member of the group consisting of oxides, hexacarbonyls and sulfides of tungsten and molybdenum, and oxides of vanadium, niobium, tantalum and rhenium.

3. The method of claim 2 wherein said disproportionation catalyst further comprises at least one member of the group consisting of silica, alumina, silica-alumina, magnesia-titania, zirconia, thoria, aluminum phosphate and zirconium phosphate.

4. The method of claim 2 wherein said 4-methyl-2-pentene is contacted with said ethylene in the presence of said disproportionation catalyst at a temperature within the range of from about 0 to about 1300° F. for a contact time of from about 0.1 second to about 24 hours and said propylene produced by said disproportionation is separated from said mixture and recycled as feed to said dimerization step.

5. The method of claim 2 wherein said propylene produced by said disproportionation is recycled as fuel to said dimerization step.

6. The method of claim 1 wherein said dimerization catalyst is tripropylaluminum and said disproportionation catalyst is silica-supported tungsten oxide.

7. The method of claim 1 wherein at least part of said mixture comprising 4-methyl-1-pentene and 4-methyl-2-pentene is contacted under olefin isomerization conditions to convert at least a part of said 4-methyl-1-pentene to 4-methyl-2-pentene.

References Cited
UNITED STATES PATENTS

| | | | |
|---|---|---|---|
| 3,094,573 | 6/1963 | Hall | 260—683.15 |
| 3,261,879 | 7/1966 | Banks | 260—683 |
| 3,272,887 | 9/1966 | Pitkethly et al. | 260—683.2 |
| 3,296,330 | 1/1967 | Sherk | 260—683 |

DELBERT E. GANTZ, Primary Examiner

C. E. SPRESSER, Assistant Examiner

U.S. Cl. X.R.

260—683.15, 683.2